Figure 1:
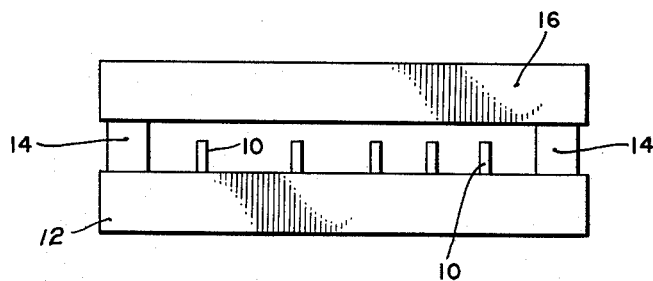

June 11, 1963   D. L. BROWN   3,093,588
LITHIUM FERRITES
Filed April 4, 1960

DANIEL L. BROWN
INVENTOR.

BY *Lyon & Lyon*

ATTORNEYS.

United States Patent Office 3,093,588
Patented June 11, 1963

3,093,588
LITHIUM FERRITES
Daniel L. Brown, Los Angeles, Calif., assignor, by mesne assignments, to Ampex Corporation, Redwood City, Calif., a corporation of California
Filed Apr. 4, 1960, Ser. No. 19,843
3 Claims. (Cl. 252—62.5)

This invention relates to a method and means for manufacturing lithium ferrites and, more particularly, to an improved method and means for manufacturing square-loop lithium ferrites.

The term "square loop" is applied to materials which exhibit a substantially rectangular hysteresis characteristic. These materials which are, for example, manganese magnesium ferrites, find extensive use in the operation of data-handling systems as a memory element. The square loop, or rectangular hysteresis characteristic, enables this material to store binary information and also to enable the readout of such stored information. Hence, its utility for memory purposes. Heretofore, lithium ferrite had been considered unsuitable for square-loop applications, since its characteristics, when treated, did not have sufficient "squareness." It was believed that it was necessary to add a nickel ferrite ($NiFe_2O_4$) to provide high squareness.

An object of this invention is to provide a method and means whereby lithium ferrite having suitable square-loop characteristics is obtained.

Another object of this invention is to provide an improved method and means for making a square-loop lithium ferrite.

Still another object of this invention is to provide an improved method and means for making a square-loop lithium ferrite that does not require the addition of nickel ferrite.

Yet another object of the present invention is an improved method and means for manufacturing a lithium ferrite that can perform both memory and switching functions at temperatures near 500° C.

These and other objects of the present invention are achieved in an arrangement wherein the raw materials for the lithium ferrite composition are mixed, calcined, ground and formed in a similar manner, as is performed with other ceramic ferrites. However, in the sintering step which follows, the lithium ferrite material is essentially provided with an environment containing lithium. This is achieved by enclosing the lithium ferrite material being sintered within lithium ferrite material of substantially the same composition. Upon cooling, the lithium ferrite material obtained as a result displays the requisite square-loop characteristics.

Figure 2:
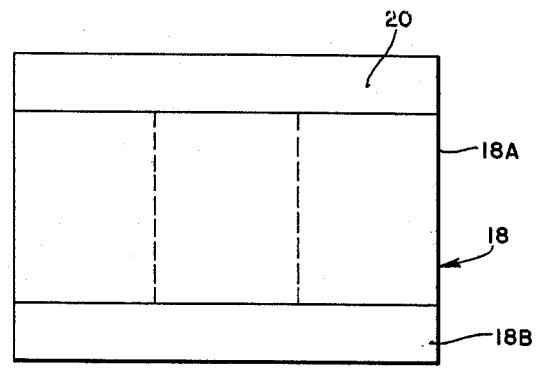

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 shows a cover and support for the lithium ferrite material which are employed during the sintering operation; and FIGURE 2 shows a container for the lithium ferrite material which is employed during the sintering operation.

A typical lithium ferrite composition which was treated in accordance with the method and means of the present invention had the composition of $Li_{1/2}Fe_{2\ 1/2}O_4$. As previously indicated, the raw materials, consisting of iron oxide, nickel oxide, or carbonate and lithium carbonate are thoroughly mixed. The raw materials are then calcined at a temperature of 750° C. The calcined material is then ground, and dried. Then binder and size are added, and the material is pressed into form. The form usually employed for memory elements is that of a toroidal core.

Heretofore, these toroidal cores were then spread out within the oven and heated to a sintering temperature, which would be on the order of 2250° F. In accordance with this invention, the toroidal cores or other forms which it is desired the material to have are surrounded with a lithium-containing ferrite, whose composition is preferably near that of the samples, while sintering. One arrangement for achieving such a result is shown in FIGURE 1. The lithium ferrite cores 10 are placed upon a support 12. Spacers 14, the size of which slightly exceeds that of the cores 10, hold a cover 16 over the cores. The support 12, cover 16, and spacers 14 are preferably made of the lithium ferrite material, similar in composition to that being manufactured.

Another arrangement for achieving the desired result in accordance with this invention is shown in FIGURE 2. Here the lithium ferrite material is completely enclosed in a container 18, having a cover 20. The lithium ferrite material being manufactured is placed within the container and the cover 20 is placed over it. The container may be made either in three parts, consisting of the cover 20, the walls 18A, and the base 18B, or of a single container and cover. The material and container are then raised to the sintering temperature, and after one or two hours, which usually is the treating time, the material is allowed to cool down.

The support and cover or the complete enclosure as represented in FIGURES 1 and 2 serve two purposes. First, they prevent the samples from reacting with undesirable material, and, second, they minimize the loss of lithium during the sintering cycle. It appears that the sintering temperature causes the lithium oxide to evaporate, thereby altering the composition and properties of the remaining material. The presence of other lithium ferrite material of substantially the same composition insures that the environment around the material being sintered contains an excess of lithium whereby the evaporation or loss of lithium is held to a minimum. The degree of enclosure required depends upon the size of the samples, sintering time and temperature, and the desired properties. A complete enclosure as shown in FIGURE 2 yields essentially the same properties as the support and cover setup shown in FIGURE 1, but does provide a better uniformity.

Lithium nickel ferrite materials, such as

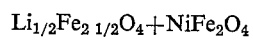

exhibit the same type of characteristics as the

previously described. This method and means of the present invention is applicable to the making of other compositions as well, namely, those lithium and lithium nickel ferrites to which zinc ferrite ($ZnFe_2O_4$), cadmium ferrites ($CdFe_2O_4$), manganese ferrite ($MnFe_2O_4$), and manganese oxide have been added.

The support and cover or the ferrite container for holding the lithium ferrite material during sintering is made of the same composition as the material desired as a finished product, as has been previously stated. In their production, the treatment employed is the same as has been described for making the desired material. However, during the sintering step, instead of the temperature of this material being raised to say 2250° F., the temperature is raised only high enough to burn out the binder material, but not high enough to drive off lithium oxide. Thus, this surrounding material will provide the required lithium oxide environment when it is subsequently raised to the sintering temperature in the treatment of the desired lithium material.

There has accordingly been described and shown a novel method and means of manufacturing a lithium ferrite material so that the resultant material will exhibit substantially rectangular hysteresis characteristics and can maintain such characteristics up to high temperatures.

I claim:

1. In a method of making square hysteresis loop lithium ferrite magnetic material wherein the magnetic material is sintered, the improvement comprising during sintering supporting said lithium ferrite material with other lithium ferrite material of substantially the same composition, and during sintering covering said lithium ferrite material with a cover of lithium ferrite material of the same composition, said cover being spaced from said material and together with said base during the sintering temperatures insures that the space between said material and said cover contains an excess of evaporated lithium.

2. In a method of making a substantially square hysteresis loop material having lithium ferrite, wherein the material is sintered, the improvement comprising surrounding said material during sintering with a separate mass of lithium ferrite material which is spaced therefrom and which has substantially the same composition.

3. A container for enclosing substantially square hysteresis loop lithium ferrite material during sintering, said container being made of substantially the same lithium ferrite material composition.

References Cited in the file of this patent

UNITED STATES PATENTS

| | | |
|---|---|---|
| 2,770,523 | Toole | Nov. 13, 1956 |
| 2,842,500 | Gibson et al. | July 8, 1958 |
| 2,851,419 | Gorter et al. | Sept. 9, 1958 |
| 3,038,860 | Vinal et al. | June 12, 1962 |

FOREIGN PATENTS

| | | |
|---|---|---|
| 1,173,386 | France | Oct. 27, 1958 |

OTHER REFERENCES

Kordes et al.: Chem. Abs., vol. 46, col. 4411, May 25, 1952.